Patented Sept. 27, 1927.

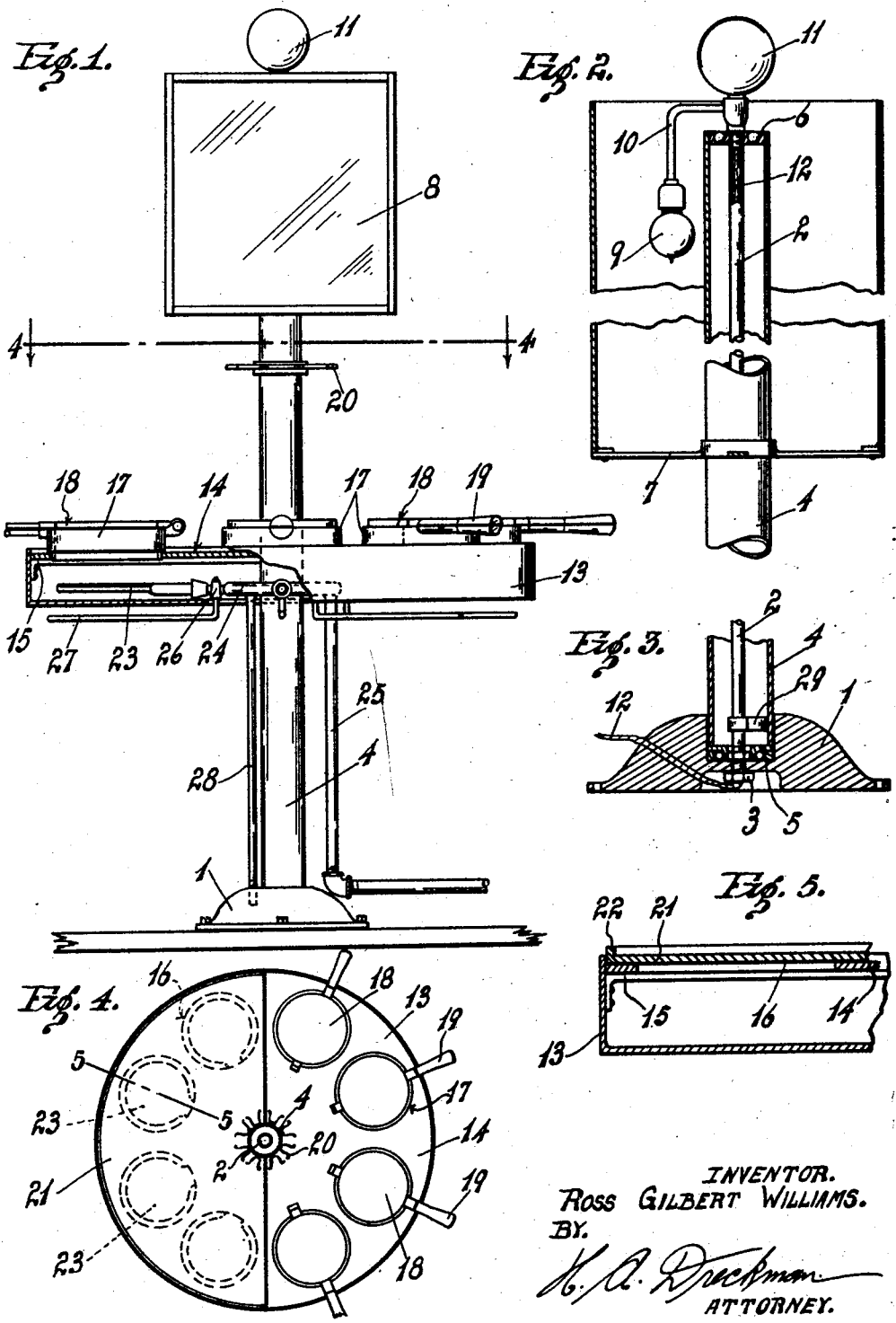

1,643,650

UNITED STATES PATENT OFFICE.

ROSS GILBERT WILLIAMS, OF LONG BEACH, CALIFORNIA.

ROTARY COMBINATION STOVE.

Application filed September 2, 1926. Serial No. 133,139.

An object of my invention is to rotatably mount a plurality of baking ovens all of which can be reached by the operator sitting in one position.

Another object is to provide a combination stove which is compact, requiring very little floor space and which is simple in construction.

A further object is to provide a stove which may be used either for baking or frying, and both baking and frying as desired.

A still further object is to provide a stove which is ornamental in appearance and which also serves to advertise the article or articles being cooked thereon.

Other objects, advantages and features of invention may appear from the accompanying drawing, the subjoined detailed description, the appended claims or in the operation of my stove.

In the drawings:

Fig. 1 is side elevation of my stove with parts broken away to show interior construction.

Fig. 2 is a fragmentary longitudinal sectional view of the upper portion of my stove.

Fig. 3 is a transverse sectional view of the base.

Fig. 4 is a sectional view taken on line 4, 4, Fig. 1.

Fig. 5 is a fragmentary sectional view taken on line 5, 5, Fig. 4.

Referring more particularly to the drawing:

The base 1 may be secured to the floor by suitable means or it may also be mounted upon wheels or casters if it is desired to provide a portable stove. A pipe 2 is secured to the base 1 by suitable means, such as the lock nuts 3 or the like. A tube 4 surrounds the pipe 2 and is rotatably mounted on a bearing 5 in the base 1, and a bearing 6 at the top of said tube 1, which last bearing is mounted on the pipe 2.

A frame 7 is secured to the tube 4 adjacent the upper end thereof, and a plurality of translucent advertising panels 8 are supported thereon. These panels are illuminated by a light 9 which light depends from a combination fitting 10, said fitting also supporting a top light 11 projecting above the panels 8. The lights 9, 11 are supplied with current by the wires 12, which wires extend through the base 1 and upwardly through the pipe 2 to said lights.

A drum 13 is secured to the tube 4 at a convenient height from the floor, said drum having a top plate 14 thereon, supported by braces 15. Plate 14 is provided with a plurality of circular openings 16 therein, in each of which openings a collar 17 is removably positioned. These collars project above the upper surface of the plate 14 and are adapted to receive the ovens 18, in which ovens waffles, cones, et cetera, may be baked.

When it is desired to change the size of the waffle or the like, the collars 17 are removed and a suitable larger or smaller size is inserted. The ovens 18 are rotatably positioned in the collars 17 so that both sides of the waffle or the like can be baked. When the baking is completed the upper half of the oven is raised and the handle 19 thereof, rests in one of the forks 20, secured to the tube 4. When it is desired to fry on the stove the ovens 18 and collars 17 are removed and a segmental plate 21 is placed on the top plate 14 to provide a frying surface. It is understood that the entire top surface of the stove may be covered by the frying plates, or only one-half may be covered as shown in Fig. 4, thus making a combination frying and baking stove.

To retain the grease, an outer upturned edge 22 is formed on the plate 21.

A plurality of stationary burners 23, are positioned in the drum 13 there being one burner for each oven 18, that is; there is one burner under each of the openings 16. These burners all extend from a circular manifold 24, said manifold being supplied with fuel through the pipe 25. Each of the burners 23 is controlled by a valve 26, which valve is operated by a lever 27 extending adjacent the outer edge of the drum 13. The manifold 24 and attached burner 23, are supported by suitable standards 28, secured in the base 1. To prevent accidental rotation of the drum 13, a spring drag 29 is secured to the pipe 2 and bears against the tube 4.

In operation, the operator either sits or stands in one position, turning the drum 13 as desired to bring the various ovens or frying plate to a position directly in front of him. In each stationary position of the drum 13 a burner 23 will be positioned directly under each of the openings 16, thus insuring a proper heat on the ovens 18.

Having described my invention, I claim:

1. A rotary combination stove comprising a drum, means rotatably mounting said drum and a plurality of circumferentially spaced stationary burners within said drum.

2. A rotary combination stove comprising a drum, means rotatably mounting said drum, a plurality of stationary burners within said drum, a top plate on said drum, said plate having a plurality of openings therein; and collars adapted to fit in said openings and ovens rotatably mounted in said collars.

3. A rotary combination stove comprising a drum, means rotatably mounting said drum and stationary burners within said drum, and removable segmental frying plates adapted to be positioned on said drum.

4. A rotary combination stove comprising a drum, means rotatably mounting said drum, a plurality of stationary burners within said drum, a top plate on said drum, said plate having a plurality of openings therein; collars removably positioned in said openings, ovens rotatably mounted in said collars and segmental frying plates adapted to be positioned on said top plate.

5. A rotary combination stove comprising a base, a vertical pipe fixed in said base, a tube surrounding said pipe, means rotatably supporting said tube, a display frame secured to said tube, a drum secured to said tube, a plurality of ovens on said drum and a plurality of stationary burners within said drum.

6. A rotary combination stove comprising a base, a vertical pipe fixed in said base, a tube surrounding said pipe means rotatably supporting said tube, a display frame secured to said tube, a drum secured to said tube, a plurality of ovens on said drum and a plurality of stationary burners within said drum; a light supported at the top of said pipe and a second light depending from the first named light adapted to illuminate the advertising frame.

7. A rotary combination stove comprising a base, a vertical pipe fixed in said base, a tube surrounding said pipe means rotatably supporting said tube, a display frame secured to said tube, a drum secured to said tube; a top plate on said drum, said plate having a plurality of openings therein; a collar removably mounted in each of said openings, an oven rotatably mounted in each collar and a plurality of stationary burners within said drum.

8. A combination rotary stove comprising a base, a tube rotatably mounted in said base, a drum secured to said tube, a top plate on said drum having a plurality of openings therein; collars removably positioned in said openings, ovens rotatably mounted in each of said collars, a fuel manifold supported within said drum burners extending from said manifold, valve control handles extending from said burners adjacent the outer edge of the drum.

9. A combination rotary stove comprising a base, a tube rotatably mounted in said base, a drum secured to said tube, a top plate on said drum having a plurality of openings therein; collars removably positioned in said openings, ovens rotatably mounted in each of said collars, a fuel manifold supported within said drum, burners extending from said manifold, valve control handles extending from said burners adjacent the outer edge of the drum; a display frame secured to said tube and segmental frying plates adapted to be positioned on said top plate.

In testimony whereof I affix my signature.

ROSS GILBERT WILLIAMS.